Dec. 5, 1933.  J. C. BAKER  1,937,865
GLASS-TO-METAL JOINT
Filed March 7, 1932
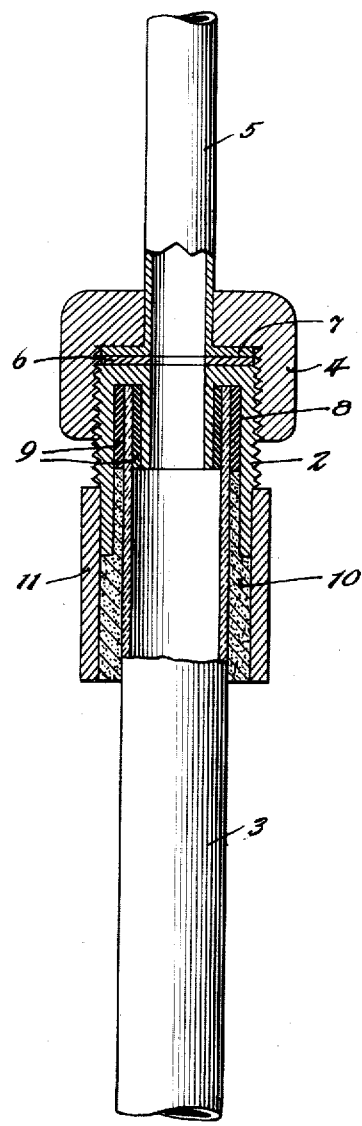
INVENTOR
John C. Baker
BY
ATTORNEY Patented Dec. 5, 1933

1,937,865

UNITED STATES PATENT OFFICE 1,937,865

GLASS-TO-METAL JOINT

John C. Baker, Montclair, N. J., assignor to Wallace & Tiernan Company, Inc., Belleville, N. J., a corporation of New York Application March 7, 1932. Serial No. 597,149

3 Claims. (Cl. 285—111)

This invention relates to glass-to-metal joints for chlorine supply apparatus. Chlorine, especially in the presence of water, is extremely corrosive and there are comparatively few materials on which it does not act. Glass is one of these materials, but the brittleness of glass and its inability to be machined restrict its use to certain parts only of such apparatus. It is frequently necessary or advisable, therefore, to use apparatus partly of metal and partly of glass. This involves the production of chlorine-tight joints between the metal and the glass. Such joints can be made directly between platinum and glass by fusing the latter onto the former, owing to the fact that platinum has a coefficient of heat expansion substantially the same as that of glass. It is however, necessary or desirable in many cases where glass to metal joints have to be made to use cheaper metals, such as silver or corrosion resistant alloys. Such cheaper metals or alloys have a higher coefficient of heat expansion than glass, which causes glass fused onto such metal or alloys to crack when cold.

I have discovered that by using a suitable relatively readily fusible material it is possible to produce by fusion a chlorine-tight lute between glass and metals or alloys having a relatively high coefficient of heat expansion. Such material must, of course, be unacted upon by chlorine either dry or moist at ordinary temperatures, and should also be substantially insoluble in water. An example of a substance fulfilling these conditions is silver chloride. It fuses at about 455° C., is wholly unacted on by chlorine, and is one of the most insoluble substances known.

The joints are usually between glass and metal tubes with the lute as an annulus between an outer metal tube and an inner glass tube, so that, as the joint cools from a temperature above the solidifying point of the lute, the metal, contracting more rapidly than the glass, will tend to compress the lute against the outer surface of the glass. If the metal is arranged inside and the glass outside, there is a possibility of leakage due to the metal shrinking away from the glass.

While the exact reasons why fused silver chloride gives a satisfactory chlorine-tight joint are not known, it is believed to be due largely to the fact that silver chloride has a very low coefficient of expansion and that when it solidifies it does not become hard and rigid but remains somewhat plastic so that it is capable of absorbing the strains produced by differential contraction of the metal, lute and glass.

An illustrative embodiment of the invention is shown in section in the accompanying drawing.

This invention is well adapted for joining the end of a glass tube to a member of a union, or coupling, whereby the glass tube may be detachably coupled to a metal tube. Such a union, or coupling, especially intended and adapted for use in chlorine supply apparatus, is shown in the drawing. The union as shown comprises an exteriorly threaded ferrule 2 to which the end of the glass tube 3 is connected by a joint according to the invention, and an interiorly threaded part 4 by which the flanged end of the tube 5 is clamped to the ferrule 2, a gasket 6 of lead or other suitable material being placed between the end of the ferrule and the flange 7 of the metal tube to make a gas and water-tight joint. The ferrule 2 and tube 5 are of silver or other metal which is resistant to chlorine or such other gas or liquid for which the device is to be used.

Referring now to the joint between the end of the glass tube and the ferrule 2, the ferrule is most desirably, and as shown, formed with a concentric annular recess 8 adapted loosely to receive the end of the glass tube 3, and a tight joint between the end of the tube and the ferrule is made by a lute of silver chloride on each side of the wall of the inserted tube end. The luting of the material on to the end of the glass tube is conveniently effected by partially filling the recess 8 of the ferrule with silver chloride in powdered or granular form, then heating the ferrule until the silver chloride is fused, and then pushing the end of the tube, which is best preheated to about the temperature of the molten silver chloride, down into the recess and holding it there until the silver chloride is solidified both inside and outside the end of the glass tube. The luting material will then fill the inner and outer annular spaces of the recesses both inside and outside of the end of the tube as shown at 9, completely filling the spaces and forming a tight joint between the glass and the metal. As the silver chloride does not become rigidly hard when it solidifies, but remains somewhat plastic at ordinary temperatures, the cooling and solidification of the lute is accomplished without danger of breakage of the glass and without putting the glass under strains which would tend to cause later breakage, while at the same time a close tight joint is secured.

As shown, the ferrule 4 is further luted to the glass tube by a packing 10 of litharge, and an outer sleeve 11 is attached to the ferrule 4 to enable a greater length of glass tubing to be covered by the packing 10. This additional lute is only to give added strength and by way of precaution against possible imperfections developing in the silver chloride lute and is ordinarily unnecessary.

It wll be understood that the term glass is used to designate vitreous materials generally, including fused quartz and the like.

What is claimed is:

1. A metal-glass joint, comprising a lute of solidified fused silver chloride.

2. A metal-glass joint, comprising an outer tubular metallic part and an inner tubular glass part and an intervening annular lute of solidified fused silver chloride.

3. A metal-glass joint for chlorine supply apparatus, comprising a glass tube, a ferrule of chlorine-resistant metal permanently attached to the end of such glass tube and sealed against escape of chlorine between the ferrule and the glass tube of solidified fused silver chloride, a metal tube, and means for detachably securing the metal to said ferrule.

JOHN C. BAKER.

CERTIFICATE OF CORRECTION.

Patent No. 1,937,865.   December 5, 1933.

JOHN C. BAKER.

It is hereby certified that error appears in the printed specification of the adove numbered patent requiring correction as follows: Page 2, line 85, claim 3, after "metal" insert the word tube; and that the said Letters Patent should be read with this correction therein that the same may conform to the record of the case in the Patent Office.

Signed and sealed this 30th day of January, A. D. 1934.

F. M. Hopkins (Seal)   Acting Commissioner of Patents.

only to give added strength and by way of precaution against possible imperfections developing in the silver chloride lute and is ordinarily unnecessary.

It wll be understood that the term glass is used to designate vitreous materials generally, including fused quartz and the like.

What is claimed is:

1. A metal-glass joint, comprising a lute of solidified fused silver chloride.

2. A metal-glass joint, comprising an outer tubular metallic part and an inner tubular glass part and an intervening annular lute of solidified fused silver chloride.

3. A metal-glass joint for chlorine supply apparatus, comprising a glass tube, a ferrule of chlorine-resistant metal permanently attached to the end of such glass tube and sealed against escape of chlorine between the ferrule and the glass tube of solidified fused silver chloride, a metal tube, and means for detachably securing the metal to said ferrule.

JOHN C. BAKER.

CERTIFICATE OF CORRECTION.

Patent No. 1,937,865.　　　　　　　　　　　　　　December 5, 1933.

JOHN C. BAKER.

It is hereby certified that error appears in the printed specification of the adove numbered patent requiring correction as follows: Page 2, line 85, claim 3, after "metal" insert the word tube; and that the said Letters Patent should be read with this correction therein that the same may conform to the record of the case in the Patent Office.

Signed and sealed this 30th day of January, A. D. 1934.

F. M. Hopkins (Seal)　　　　　　　　　　　　　　Acting Commissioner of Patents.